United States Patent
Ta et al.

(10) Patent No.: US 9,969,303 B2
(45) Date of Patent: May 15, 2018

(54) DRIVING DEVICE AND SEAR ADJUSTING MECHANISM FOR VEHICLE

(71) Applicant: Johnson Electric S.A., Murten (CH)

(72) Inventors: Jing Ning Ta, Hong Kong (CN); Yong Jun Zhao, Shenzhen (CN); Qiu Mei Li, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 0 days. days.

(21) Appl. No.: 15/441,676

(22) Filed: Feb. 24, 2017

(65) Prior Publication Data
US 2017/0259708 A1 Sep. 14, 2017

(30) Foreign Application Priority Data

Mar. 9, 2016 (CN) .......................... 2016 1 0134109

(51) Int. Cl.
| | |
|---|---|
| *B60N 2/22* | (2006.01) |
| *B60N 2/23* | (2006.01) |
| *B60N 2/02* | (2006.01) |
| *F16H 1/20* | (2006.01) |
| *F16H 55/22* | (2006.01) |
| *F16H 57/039* | (2012.01) |

(52) U.S. Cl.
CPC ......... *B60N 2/2231* (2013.01); *B60N 2/0232* (2013.01); *F16H 1/203* (2013.01); *F16H 1/206* (2013.01); *F16H 55/22* (2013.01); *F16H 57/039* (2013.01); *B60N 2002/0236* (2013.01)

(58) Field of Classification Search
CPC ................ B60N 2/2231; B60N 2/0232; B60N 2002/0236
USPC ................ 297/362.11, 362.14, 344.1–344.17
See application file for complete search history.

(56) References Cited

U.S. PATENT DOCUMENTS

| | | | | |
|---|---|---|---|---|
| 4,962,963 | A * | 10/1990 | Robinson | B60N 2/0232 297/362 |
| 6,158,811 | A * | 12/2000 | Hofschulte | B60N 2/0224 297/330 |
| 7,041,024 | B2 * | 5/2006 | Becker | B60N 2/0232 475/162 |
| 7,322,257 | B2 * | 1/2008 | Becker | B60N 2/0232 74/409 |
| 7,360,471 | B2 * | 4/2008 | Lavoie | B60N 2/0296 192/48.2 |

(Continued)

*Primary Examiner* — Rodney B White
(74) *Attorney, Agent, or Firm* — Muncy, Geissler, Olds & Lowe, P.C.

(57) ABSTRACT

A driving device and a seat adjusting mechanism for vehicle are provided. The driving device includes a motor and a gearbox. The gearbox includes a worm and a worm gear. The worm is fixedly connected to an output shaft of the motor. The gearbox further includes first and second driving gears, and first and second driven gears. The first and second driving gears are coaxially fixed to the worm gear and located at two sides of the worm gear, respectively. The first and second driven gears are fixed coaxially with each other and engaged with the first and second driving gears, respectively. Two driving gears are arranged at the two sides of the worm gear symmetrically, and two driven gears are also arranged at the two sides of the worm gear symmetrically, which results in a compact structure and reduced volume of the driving device.

17 Claims, 5 Drawing Sheets

(56) References Cited

U.S. PATENT DOCUMENTS

| | | | | |
|---|---|---|---|---|
| 8,783,774 B2* | 7/2014 | Berres | ............... | B60N 2/0232 |
| | | | | 297/361.1 |
| 9,121,482 B2* | 9/2015 | Nakamura | ........... | B60N 2/0232 |
| 9,421,891 B2* | 8/2016 | Andres | ............... | B60N 2/0232 |
| 9,604,550 B2* | 3/2017 | Ito | ........................ | B60N 2/0228 |
| 9,797,493 B2* | 10/2017 | Ta | ........................ | F16H 1/203 |
| 9,856,944 B2* | 1/2018 | Ortiz | ........................ | F16H 1/32 |
| 2005/0168027 A1* | 8/2005 | McMillen | ............ | B60N 2/0232 |
| | | | | 297/284.4 |
| 2010/0308634 A1* | 12/2010 | Narita | ............... | B60N 2/0232 |
| | | | | 297/362 |

* cited by examiner

DRIVING DEVICE AND SEAR ADJUSTING MECHANISM FOR VEHICLE

CROSS REFERENCE TO RELATED APPLICATIONS

This non-provisional patent application claims priority under 35 U.S.C. § 119(a) from Patent Application No. 201610134109.3 filed in The People's Republic of China on Mar. 9, 2016.

FIELD OF THE INVENTION

This invention relates to a driving device having a motor and a gearbox, which is especially suitable for adjusting a seat back.

BACKGROUND OF THE INVENTION

Many seats have a seat back with adjustable angle. Users can adjust an inclination angle of the seat back through a driving device. There is a desire for a driving device having smaller size and lighter weight.

SUMMARY OF THE INVENTION

Thus, there is a desire for a smaller, lighter and low-cost driving device.

A driving device is provided which includes a motor and a gearbox. The gearbox includes a worm and a worm gear. The worm is fixedly connected to an output shaft of the motor and rotates coaxially along with the output shaft of the motor. The worm gear is engaged with the worm. The gearbox further includes a first driving gear, a second driving gear, a first driven gear, and a second driven gear. The first driving gear and the second driving gear are coaxially fixed to the worm gear and located at two sides of the worm gear, respectively. The first driven gear and the second driven gear are fixed coaxially with each other and engaged with the first driving gear and the second driving gear, respectively.

Preferably, the first driving gear and the second driving gear are arranged at two sides of the worm gear symmetrically.

Preferably, the first driven gear and the second driven gear are arranged at the two sides of the worm gear symmetrically.

Preferably, a distance between end faces of the first driving gear and the second driving gear away from the worm gear is equal to or greater than a distance between end faces of the first driven gear and the second driven gear away from the worm gear.

Preferably, a housing of the gearbox includes a housing main body and a housing cover locked together, the housing main body is a chamber with an opening, the housing cover is covered on the opening, and the worm, the worm gear, the first driving gear, the second driving gear, the first driven gear, and the second driven gear are received in the chamber.

Preferably, a bearing is mounted around the output shaft of the motor between the worm and the motor, and the housing main body includes a bearing seat for mounting the bearing.

Preferably, the first driving gear and the second driving gear are formed as an integral piece, and the worm gear is fixed to or one-piece formed with the integral piece.

Preferably, a positioning portion protrudes from a junction of the integral piece between the first driving gear and the second driving gear, and an inner side of the worm gear wraps the positioning portion.

Preferably, the worm gear includes a hub connected to the integral piece, a connecting plate extending radially and outwardly from the hub, and an outer ring fixed to an outer edge of the connecting plate, teeth of the worm gear are formed on the outer ring, and the connecting plate forms a plurality of reinforcing ribs.

Preferably, the connecting plate forms a first reinforcing ring, the first reinforcing ring surrounds the hub and is located between the hub and the outer ring, and the reinforcing ribs are connected between the hub and the first reinforcing ring.

Preferably, the reinforcing ribs are connected between the hub and the first reinforcing ring.

Preferably, a second reinforcing ring is further formed at an outer side of the hub, and the reinforcing ribs extend outwardly from the second reinforcing ring.

Preferably, two sides of the connecting plate have the same construction.

Preferably, a ratio of a height of the gearbox to a thickness of the motor is greater than or equal to 0.8 and less than or equal to 1.2.

Preferably, each of the first driven gear and second driven gear includes a driven gear hub, a driven gear connecting plate extending radially and outwardly from the driven gear hub, and a driven gear outer ring fixed to an outer edge of the driven gear connecting plate, teeth of each driven gear are formed on a circumferential surface of the driven gear outer ring, and a side of the driven gear connecting plate away from the worm gear forms a plurality of second reinforcing ribs.

Preferably, the side of the driven gear connecting plate away from the worm gear forms a third reinforcing ring, and the third reinforcing ring surrounds the driven gear hub and is located between the driven gear hub and the driven gear outer ring.

Preferably, end faces of the first driven gear and the second driven gear close to each other are substantially planar and parallel to each other, and a receiving space is defined between the end faces to receive the worm gear.

A seat adjusting mechanism for a vehicle includes the above driving device.

The present invention has the following advantages: two driving gears are arranged at two sides of the worm gear symmetrically, and two driven gears are also arranged at the two sides of the worm gear symmetrically, which improves a usage rate of space and reduces the height of the gearbox. Accordingly, the whole size and weight of the driving device is reduced. The present invention reduces the volume of the driving device on the premise of maintaining relevant performance.

DETAILED DESCRIPTION OF THE EMBODIMENTS

The present invention will now be described further, by way of example only, with reference to the accompanying drawings.

Figure 1:
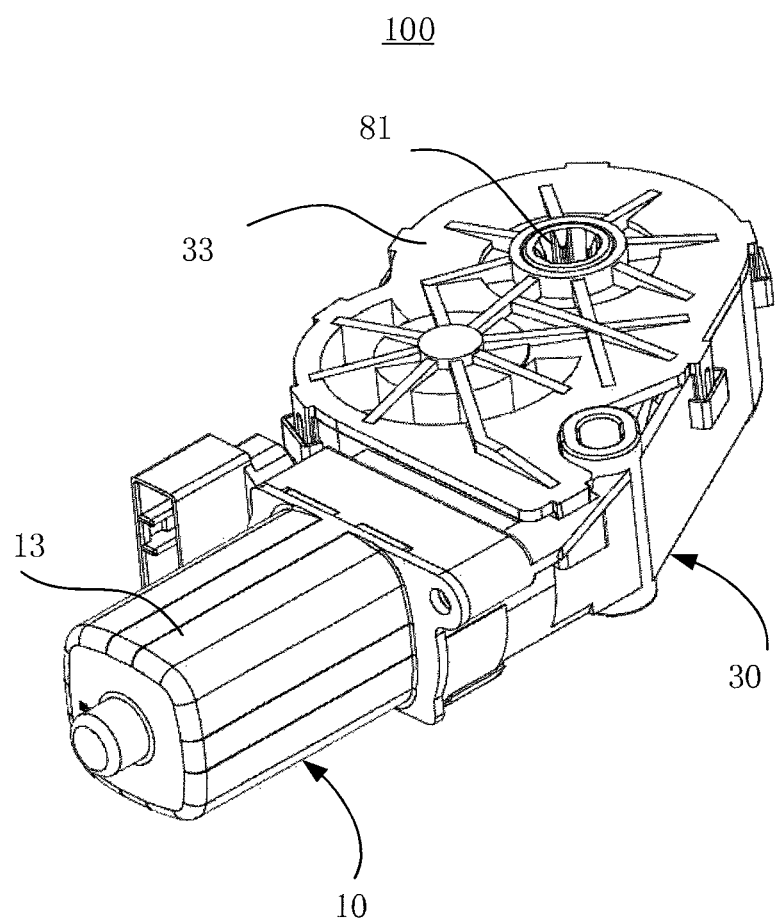
FIG. 1 is a perspective view of a driving device according to an embodiment of the present invention.
Figure 2:
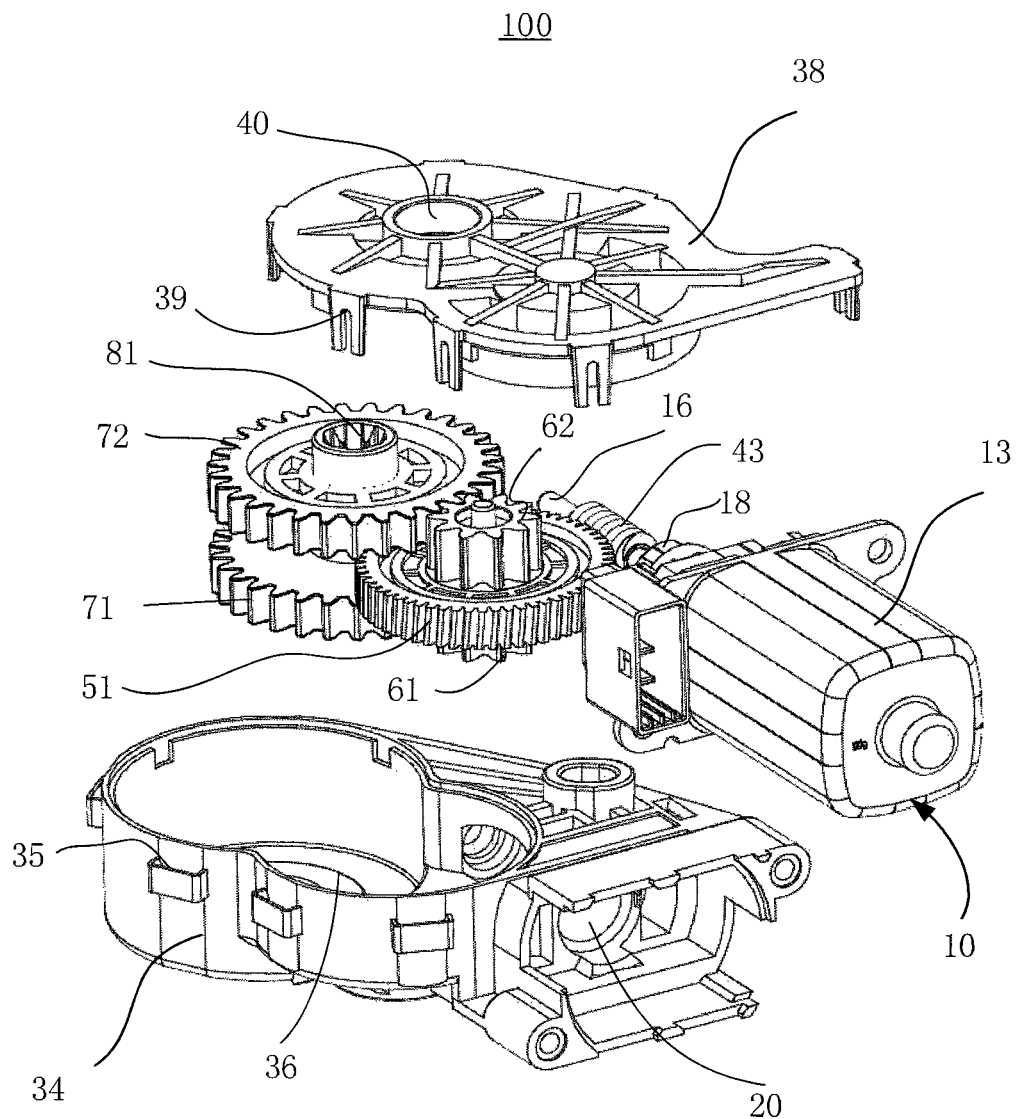
FIG. 2 is an exploded view of the driving device of FIG. 1.
Figure 3:
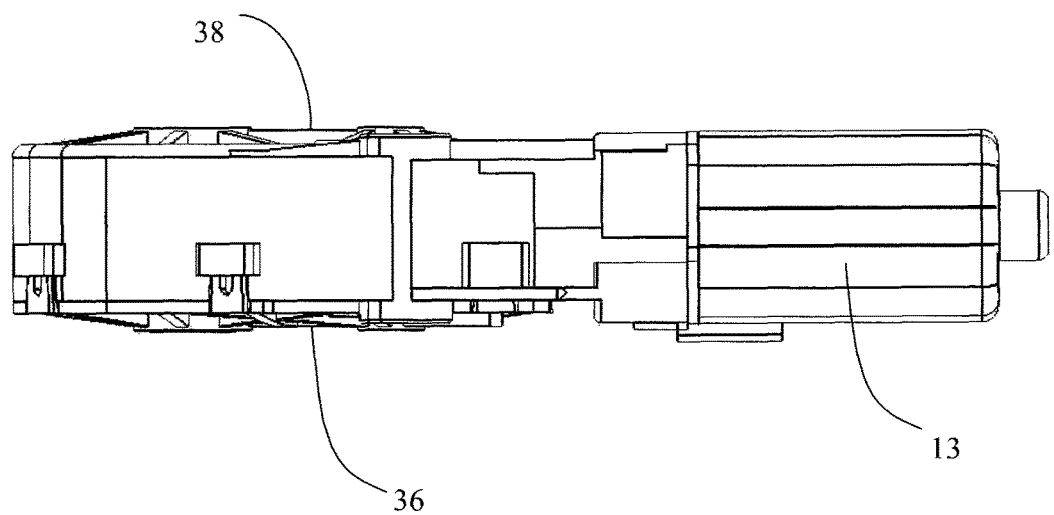
FIG. 3 is a side view of the driving device of FIG. 1.

Referring to FIG. 1, FIG. 2 and FIG. 3, a driving device 100 of an embodiment of the present invention includes a motor 10 and a gearbox 30. The gearbox 30 is mounted to an output shaft 16 of the motor 10. A housing 33 of the gearbox 30 includes a housing main body 34 and a housing cover 38 locked together. The housing main body 34 is a chamber with an opening. The housing cover 38 is covered on the opening by latches 39, which is convenient for assembly, disassembly, and maintenance. A bottom plate 36 of the housing main body 34 and the housing cover 38 are substantially flush with a bottom and a top of a housing 13 of the motor 10, respectively. A height of the gearbox 30 (along a direction of an output shaft 81 of the gearbox 30) is close to a thickness of the motor 10 (along a direction parallel to the output shaft 81 of the gearbox 30). Preferably, a ratio of the height of the gearbox 30 to the thickness of the motor 10 is greater than or equal to 0.8 and less than or equal to 1.2; such a design makes a compact structure. Compared to conventional driving device 100 in which the height of the gearbox 30 is obviously greater than the thickness of the motor 10, the height of the gearbox 30 of the driving device 100 of the present invention is close to the thickness of the motor 10, which results in a significantly reduced volume of the whole device.

The gearbox 30 includes a worm 43, a worm gear 51, a first driving gear 61, a second driving gear 62, a first driven gear 71, and a second driven gear 72. The worm 43 is fixed onto the output shaft 16 of the motor 10 and can rotate coaxially along with the output shaft 16 of the motor 10. In this embodiment, the worm 43 is fixedly mounted around the output shaft 16. Alternatively, the worm 43 can be directly one-piece formed with the output shaft 16 or connected to the output shaft 16 through a third member. Anyhow, the worm 43 can be provided in any suitable manner as long as the worm 43 can rotate along with the output shaft 16. The worm gear 51 is rotatably mounted in the gearbox 30, and engaged with the worm 43. In this embodiment, the first driving gear 61 and the second driving gear 62 are fixed at two sides of the worm gear 51, respectively, and rotate coaxially with the worm gear 51. The first driven gear 71 and the second driven gear 72 are fixed coaxially together and engaged with the first driving gear 61 and the second driving gear 62, respectively. The worm 43, the worm gear 51, the first driving gear 61, the second driving gear 62, the first driven gear 71, and the second driven gear 72 are received in the chamber of the housing main body 34. A pitch of the first driving gear 61 is the same as that of the second driving gear 62, and a pitch of the first driven gear 71 is the same as that of the second driven gear 72. Preferably, the pitches of the first driving gear 61, the second driving gear 62, the first driven gear 71, and the second driven gear 72 all are greater than that of the worm gear 51. The arrangement of the dual driving gears 61, 62 and dual driven gears 71, 72 can achieve dual-side output of the gearbox 30, increase the contact ratio of gears along the axial direction, and reduce an axial size of the gearbox 30 (i.e., the height of the gearbox 30). The present invention reduces the volume and weight while satisfying the required power.

Preferably, outer diameters of the first driving gear 61 and the second driving gear 62 are the same. Thus, two sides of the worm gear 51 have symmetric structures, which ensure stability during transmission.

Preferably, an axial cross section through an axis of the worm gear 51 is coplanar with an axial cross section through an axis of the output shaft 16. The first driving gear 61 and the second driving gear 62 are arranged at two sides of the worm gear 51 symmetrically. The first driven gear 71 and the second driven gear 72 are arranged beside two sides of the worm gear 51 symmetrically. This makes the gearbox 30 have a symmetric structure, and improves a usage rate of space. The height of the gearbox 30 is thus reduced, and accordingly the whole size of the driving device 100 is reduced.

Preferably, a distance between end faces 61a, 62a (referring to FIG. 5) of the first driving gear 61 and the second driving gear 62 away from the worm gear 51 is equal to or greater than a distance between outer end faces 71a, 72a (referring to FIG. 8) of the first driven gear 71 and the second driven gear 72. This reduces the axial size of the gearbox 30 as much as possible on the premise of ensuring power transmission.

Preferably, a bearing 18 is attached around the output shaft 16 of the motor 10 between the worm 43 and the motor 10, and the housing main body 34 includes therein a bearing seat 20 for mounting the bearing 18. In this design, a bearing is no longer needed at an end of the motor 10 facing to the gearbox 30, which therefore simplifies the structure of the motor 10 and reduces the size of the whole driving device 100.

Preferably, two sides of an edge of the housing cover 38 form a plurality of spaced latches 39, and a periphery of the housing main body 34 forms a plurality of locks 35 corresponding to the latches 39. The latches 39 engage in the locks 35, which is convenient for disassembly, assembly and maintenance.

Figure 4:
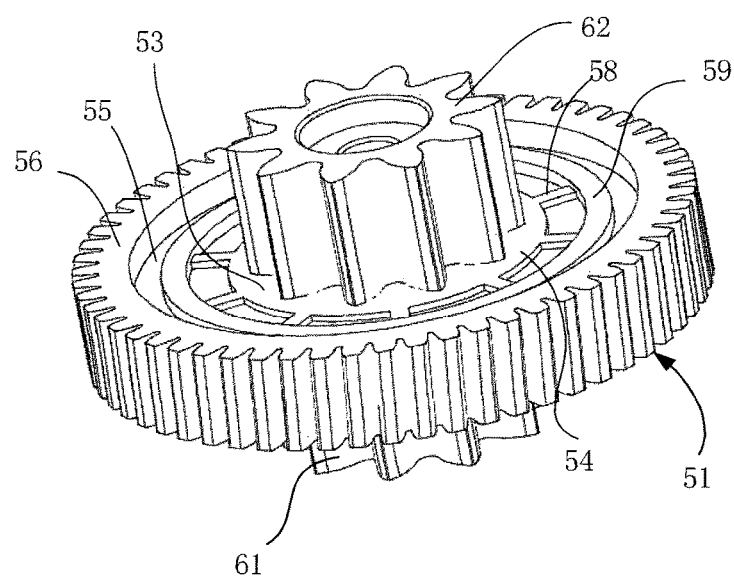
FIG. 4 is a schematic view of a worm gear and two driving gears of the driving device of FIG. 2.
Figure 5:
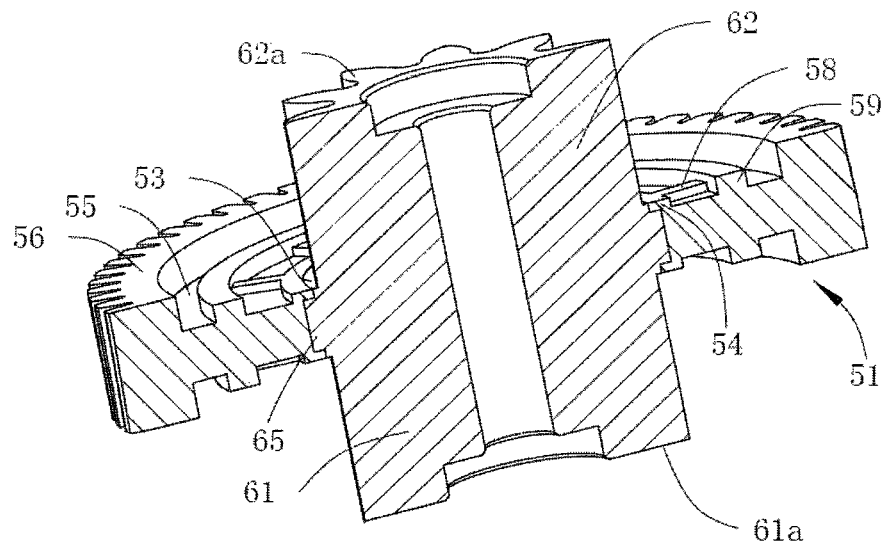
FIG. 5 is a sectional view of the worm gear and the two driving gears of FIG. 4.

Referring to FIG. 4 and FIG. 5, the first driving gear 61 and the second driving gear 62 are formed as an integral piece, and a positioning portion 65 protrudes directly from a junction of the first driving gear 61 and the second driving gear 62. The positioning portion 65 can be a plurality of protruding blocks 35 arranged along a circumferential direction or an annular body. The worm gear 51 is fixed to or one-piece formed with the integral piece of the first and second driving gear 61 and 62, and wraps the position portion 65.

The worm gear 51 includes a hub 53 connected to the integral piece of the first and second driving gear 61 and 62, a connecting plate 55 extending radially and outwardly from the hub 53, and an outer ring 56 fixed to an outer edge of the connecting plate 55. Teeth of the worm gear 51 are formed on the outer ring 56. The hub 53 covers two axial end faces of the positioning portion 65 to achieve axial positioning of the first and second driving gears 61 and 62. The hub 53 further covers grooves at two sides of the positioning portion 65 to achieve circumferential positioning of the first and second driving gears 61 and 62. The connecting plate 55 forms a plurality of reinforcing ribs 58. The reinforcing ribs 58 extend outwardly from the hub 53.

Further, the connecting plate 55 forms a first reinforcing ring 59. The first reinforcing ring 59 surrounds the hub 53 and is located between the hub 53 and the outer ring 56.

Further, the reinforcing ribs 58 are connected between the hub 53 and the first reinforcing ring 59.

Figure 6:
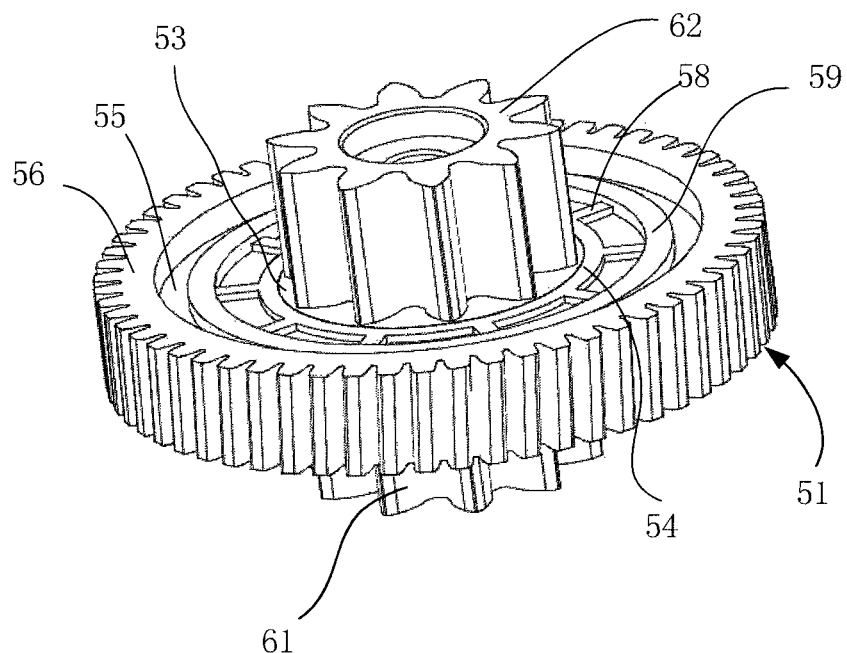
FIG. 6 is a schematic view of a worm gear and two driving gears according to an alternative embodiment of the present invention.

Further, the hub 53 extends beyond the connecting plate 55 in the axial direction. A second reinforcing ring 54 is formed on an outer side of the hub 53. The reinforcing ribs 58 are connected between the first reinforcing ring 59 and the second reinforcing ring 54. In this embodiment, the second reinforcing ring 54 is flush with the hub 53. In an alternative embodiment, as shown in FIG. 6, the second reinforcing ring 54 protrudes beyond the hub 53.

Preferably, two sides of the connecting plate 55 have the same construction.

Figure 7:
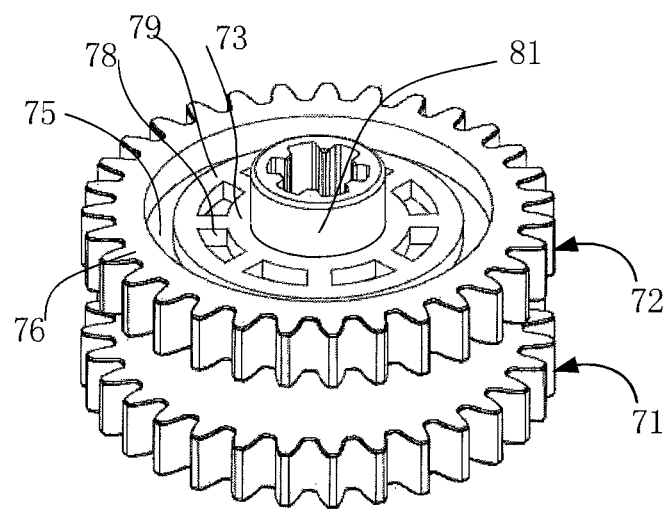
FIG. 7 is a perspective view of a first driven gear and a second driven gear fixed on an output shaft of the driven gear of the driving device of FIG. 1.
Figure 8:
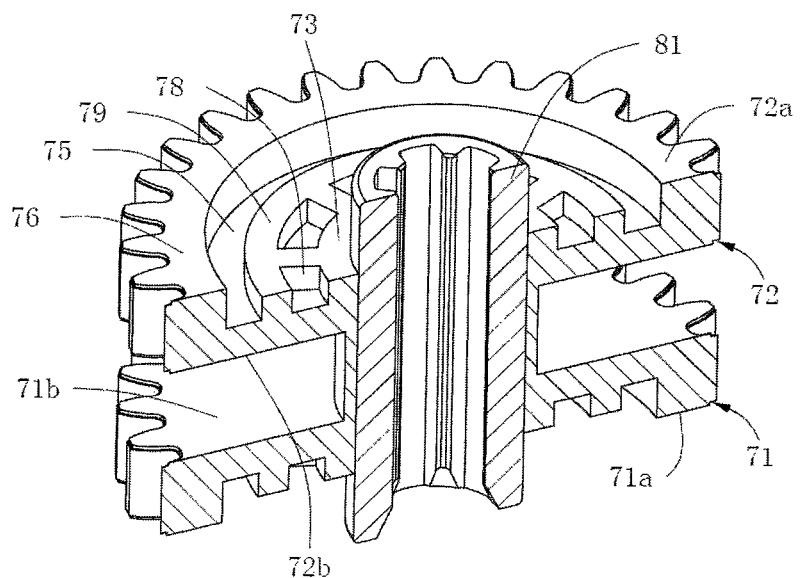
FIG. 8 is a sectional view of components of FIG. 7.

Referring to FIG. 7 and FIG. 8, the first driven gear 71 and the second driven gear 72 are coaxially fixed to the output shaft 81 of the gearbox 30. The output shaft 81 of the gearbox 30 defines a spline hole. The housing cover 38 and/or the housing main body 34 define an output shaft hole 40 (referring to FIG. 2) corresponding to the output shaft 81 of the gearbox 30. A distal end portion of the output shaft 81 of the gearbox 30 is mounted in or extends out of the output shaft hole 40. The first driven gear 71 and the second driven gear 72 are the same in construction. Each of the driven gears 71, 72 includes a driven gear hub 73 connected to the output shaft 81 of the gearbox 30, a driven gear connecting plate 75 extending radially and outwardly from the driven gear hub 73, and a driven gear outer ring 76 fixed to an outer edge of the driven gear connecting plate 75. Teeth of each driven gear 71, 72 are formed on a circumferential surface of the driven gear outer ring 76.

A side of the driven gear connecting plate 75 near to the end portion of the output shaft 81 of the gearbox 30 forms a plurality of second reinforcing ribs 78 for improving strength. Preferably, the second reinforcing ribs 78 extend outwardly from the driven gear hub 73.

Further, the side of the driven gear connecting plate 75 near to the end portion of the output shaft 81 of the gearbox 30 forms a third reinforcing ring 79. The third reinforcing ring 79 surrounds the driven gear hub 73 and is located between the driven gear hub 73 and the driven gear outer ring 76, for enhancing strength of the driven gear 71, 72.

Further, the second reinforcing ribs 78 are connected between the third reinforcing ring 79 and the driven gear hub 73.

Preferably, end faces 71b, 72b of the first driven gear 71 and the second driven gear 72 close to each other are substantially planar and parallel to each other. The two planar end faces 71b, 72b define a receiving space therebetween for receiving the worm gear 51 therein.

The driving device of the present invention has a simple and compact structure, small size, and light weight, which facilitates assembly and maintenance and has a lower cost, satisfying the user's needs.

The driving device of the present invention is especially suitable for use in a seat adjusting mechanism for vehicle.

The embodiments described above are illustrative rather than limiting. Various modifications can be apparent to persons skilled in the art without departing from the scope of the invention, and all of such modifications should fall within the scope of the present invention.

The invention claimed is:

1. A driving device comprising:
a motor comprising an output shaft; and
a gearbox comprising:
  a worm coaxially fixed to the output shaft of the motor;
  a worm gear engaged with the worm;
  a first driving gear and a second driving gear coaxially fixed to the worm gear and located at two sides of the worm gear, respectively; and
  a first driven gear and a second driven gear fixed coaxially with each other and engaged with the first driving gear and the second driving gear, respectively.

2. The driving device of claim 1, wherein the first driving gear and the second driving gear are arranged at two sides of the worm gear symmetrically.

3. The driving device of claim 2, wherein the first driven gear and the second driven gear are arranged at the two sides of the worm gear symmetrically.

4. The driving device of claim 1, wherein a distance between end faces of the first driving gear and the second driving gear away from the worm gear is equal to or greater than a distance between end faces of the first driven gear and the second driven gear away from the worm gear.

5. The driving device of claim 1, wherein a housing of the gearbox comprises a housing main body and a housing cover locked together, the housing main body is a chamber with an opening, the housing cover is covered on the opening, and the worm, the worm gear, the first driving gear, the second driving gear, the first driven gear and the second driven gear are received in the chamber.

6. The driving device of claim 5, wherein a bearing is mounted around the output shaft of the motor between the worm and the motor, and the housing main body comprises a bearing seat for mounting the bearing.

7. The driving device of claim 1, wherein the first driving gear and the second driving gear are formed as an integral piece, and the worm gear is fixed to or one-piece formed with the integral piece.

8. The driving device of claim 7, wherein the worm gear comprises a hub connected to the integral piece, a connecting plate extending radially and outwardly from the hub, and an outer ring fixed to an outer edge of the connecting plate, teeth of the worm gear are formed on the outer ring, and the connecting plate fauns a plurality of reinforcing ribs.

9. The driving device of claim 8, wherein the connecting plate forms a first reinforcing ring, the first reinforcing ring surrounds the hub and is located between the hub and the outer ring, and the reinforcing ribs are connected between the hub and the first reinforcing ring.

10. The driving device of claim 8, wherein a second reinforcing ring is further formed on an outer side of the hub, and the reinforcing ribs extend outwardly from the second reinforcing ring.

11. The driving device of claim 8, wherein two sides of the connecting plate have the same construction.

12. The driving device of claim 7, wherein a positioning portion protrudes from a junction of the integral piece of the first driving gear and the second driving gear, and an inner side of the worm gear wraps the positioning portion.

13. The driving device of claim 1, wherein a ratio of a height of the gearbox to a thickness of the motor is greater than or equal to 0.8 and less than or equal to 1.2.

14. The driving device of claim 1, wherein each of the first driven gear and second driven gear comprises a driven gear hub, a driven gear connecting plate extending radially and outwardly from the driven gear hub, and a driven gear outer ring fixed to an outer edge of the driven gear connecting plate, teeth of each driven gear are formed on a circumferential surface of the driven gear outer ring, and a side of each driven gear connecting plate away from the worm gear forms a plurality of second reinforcing ribs.

15. The driving device of claim 14, wherein the side of each driven gear connecting plate away from the worm gear forms a third reinforcing ring, and the third reinforcing ring surrounds the driven gear hub and is located between the driven gear hub and the driven gear outer ring.

16. The driving device of claim 14, wherein end faces of the first driven gear and the second driven gear close to each other are substantially planar and parallel to each other, a receiving space is defined between the end faces to receive the worm gear.

17. A seat adjusting mechanism for vehicle, comprising a driving device, the driving device comprising:
   a motor; and
   a gearbox comprising:
      a worm fixedly connected to an output shaft of the motor and rotating coaxially along with the output shaft of the motor;
      a worm gear engaged with the worm;
      a first driving gear and a second driving gear being coaxially fixed to the worm gear and located at two sides of the worm gear, respectively; and
      a first driven gear and a second driven gear being fixed coaxially with each other and engaged with the first driving gear and the second driving gear, respectively.

* * * * *

UNITED STATES PATENT AND TRADEMARK OFFICE
CERTIFICATE OF CORRECTION

PATENT NO. : 9,969,303 B2  
APPLICATION NO. : 15/441676  
DATED : May 15, 2018  
INVENTOR(S) : Jing Ning Ta et al.

Page 1 of 1

It is certified that error appears in the above-identified patent and that said Letters Patent is hereby corrected as shown below:

On the Title Page

Item [54], delete "DRIVING DEVICE AND SEAR ADJUSTING MECHANISM FOR VEHICLE" and insert --DRIVING DEVICE AND SEAT ADJUSTING MECHANISM FOR VEHICLE--

Signed and Sealed this  
Twenty-first Day of May, 2019

Andrei Iancu  
*Director of the United States Patent and Trademark Office*